United States Patent

Fraser et al.

[11] Patent Number: 6,108,926
[45] Date of Patent: Aug. 29, 2000

[54] TAPE MEASURE WITH CHALK LINE, PENCIL SHARPENER, FRICTION POSITION HOLDER AND STUD HOLDER

[76] Inventors: Robert A. Fraser, 3 Evans St.; Lori A. Thomas; Charles C. Thomas, both of 76 Sweetwater St.; Anne S. Fraser; Eric J. Fraser, both of 3 Evans St., all of Saugus, Mass. 01906; Andrew R. Fraser; June R. Fraher, both of 8 Michael Rd., Lynn, Mass. 01904

[21] Appl. No.: 09/201,094

[22] Filed: Nov. 30, 1998

[51] Int. Cl.[7] .................................................. G01B 3/10
[52] U.S. Cl. .............................. 33/768; 33/760; 33/758; 33/770
[58] Field of Search .......................... 33/413, 414, 756, 33/755, 758, 759, 760, 761, 768–770

[56] References Cited

U.S. PATENT DOCUMENTS

| | | | |
|---|---|---|---|
| D. 182,165 | 2/1958 | Caruso | D52/1 |
| D. 219,065 | 10/1970 | Zelnick | D52/1 |
| D. 339,536 | 9/1993 | Ribron | D10/72 |
| D. 341,545 | 11/1993 | Killian | D10/72 |
| 2,942,348 | 6/1960 | Caruso | 33/89 |
| 4,580,347 | 4/1986 | McKnight | 33/769 |
| 4,603,481 | 8/1986 | Cohen et al. | 33/768 |
| 5,016,360 | 5/1991 | Starcevich | 33/758 |
| 5,040,256 | 8/1991 | Mills | 7/164 |
| 5,172,486 | 12/1992 | Waldherr | 33/770 |
| 5,212,875 | 5/1993 | Corso | 33/414 |
| 5,367,785 | 11/1994 | Benarroch | 33/768 |
| 5,379,524 | 1/1995 | Dawson | 33/768 |
| 5,383,285 | 1/1995 | Takahashi | 33/756 |
| 5,430,952 | 7/1995 | Betts | 33/760 |
| 5,435,074 | 7/1995 | Holevas et al. | 33/761 |
| 5,809,662 | 9/1998 | Skinner | 33/770 |
| 5,894,677 | 4/1999 | Hoffman | 33/759 |

FOREIGN PATENT DOCUMENTS 2216870  10/1989  United Kingdom .................... 33/764

Primary Examiner—Christopher W. Fulton
Assistant Examiner—Quyen Doan
Attorney, Agent, or Firm—Jacobson, Price, Holman & Stern, PLLC

[57] ABSTRACT

A retractable tape measure of basically conventional design is provided and includes a tape spool hub projecting slightly outwardly of one side of the tape measure housing. A conventional blade-type belt clip includes a free end portion which overlies the hub for frictional engagement therewith upon inward deflection of the clip free end portion by inward finger pressure applied to the outer side thereof. The abutment flange carried by the free end of the tape has the usual opening formed therethrough (previously provided to receive a brad or tack) and a sharp pointed hook is shiftably supported from the tape free end and projectable through the opening. The pointed hook may be manually forced through the opening for penetrating a penetrable surface against which the tape end abutment flange is abutted. The housing of the tape measure includes a spool mounted chalk line and internal opposing pads between which the chalk line passes for wiping excess chalk therefrom. Also, housing includes large and small diameter pencil sharpeners as well as an external cushion for engagement by the free tape end abutment flange to cushion termination of movement of the tape toward its limit retracted position.

2 Claims, 6 Drawing Sheets

TAPE MEASURE WITH CHALK LINE, PENCIL SHARPENER, FRICTION POSITION HOLDER AND STUD HOLDER

REFERENCES TO RELATED APPLICATIONS

NOT APPLICABLE

STATEMENT REGARDING FEDERAL SPONSORED RESEARCH OR DEVELOPMENT

NOT APPLICABLE

BACKGROUND OF THE INVENTION

1. Field of the Invention

This invention relates to a generally conventional spring return tape measure incorporating a chalk line, a pencil sharpener for regular and large size pencils, a tape spool friction brake and a penetrable surface engaging tang shiftably mounted for limited movement longitudinally of the measure tape free end, all of which features combine to provide a builders or remodelers tape which may be used to make conventional measurements, to make a chalk line marking, to sharpen drawing pencils as well as larger size carpenter's pencils and to enable a single person to releasably secure the tape free end relative to a penetrable surface.

2. Description of Related Art

The following prior U.S. patents disclose various tape measures including some of the features incorporated in the instant invention.

U.S. Pat. No. 2,942,348 to J. Caruso discloses a tape measure incorporating a spirit level. U.S. Pat. No. 5,040,256 to Norman T. Mills discloses a tape measure incorporating a pencil sharpener and a knife sharpener. U.S. Pat. No. 5,379,524 to Melvin Dawson discloses a tape measure incorporating a sheet rock trimmer, a beeper, a calculator and a clock/timer, a scoring blade, a countersink, a level, a compass point and a compass pencil holder.

The U.S. Pat. No. 5,430,952 to Betts, discloses a tape measure equipped with a spirit level, a compass point and pencil holder, a pencil, a note pad, a cutting blade and a flashlight. U.S. Design Patent Nos. Des. 182,165, 219,065, 339,536 and 341,545 disclose tape measures including spirit levels, magnifying glasses and pencil sharpeners.

However, the above noted prior U.S. patents do not disclose a tape measure incorporating a chalk line, sharpeners for regular and large size pencils, a tape spool friction brake or a penetrable surface engaging tang shiftable through the opening in the conventional anchor flange on a measure tape free end.

SUMMARY OF THE INVENTION

When a builder, remodeler or carpenter as well as other persons performing similar tasks are engaged in their professions they often have use for tape measures and chalk lines as well as pencil sharpeners for both regular and large size pencils. In addition, these persons often work by themselves while using a tape measure and have use for a tape measure spool friction brake (as opposed to a positive tape brake) as well as a need for someone or some structure operative to maintain the free end of a tape measure engaged with an object while the tape spool is moved to a distant object or location for determining the distance between the objects or between the first object and the distant location. Conventional tape measures are provided with tape free end abutment flanges or hooks such as that disclosed at 8 in U.S. Pat. No. 2,942,348 to provide some structure by which the free end of the tape measure may be frictionally engaged with a surface facing in the direction opposite to the direction in which the tape spool is being extended toward a distant location. More recently designed hooks of this type are shiftably supported from the tape end for limited movement longitudinally of the tape (such movement being equivalent only to the thickness of the hook). However, such conventional abutment flanges provide only a smooth surface for engaging a surface (to prevent marring of a surface which should not be marred) and offer insufficient frictional engagement with at least some surfaces to ensure non-slip support of the tape free end while the user of the tape measure extends the housing or spool of the tape toward a distant location.

Accordingly, a need exists for a tape end abutment flange structure which may be used in the conventional manner with regard to surfaces which should not be marred, but which also may be used in conjunction with penetrable surfaces in a superior manner to substantially eliminate any possible slipping of the tape end abutment flange relative to such a penetrable surface during usage of the tape measure to determine the distance to a remote location.

In addition, in many instances the necessity to use a tape measure and to provide a chalk line are intimately related and substantially all users of tape measures have need for the use of a conventional size marking pencil and a larger carpenter's pencil and thus the need for a sharpener of both types of pencils. Still further, although conventional retractable tape measures include positive brakes for maintaining a spring biased tape in a predetermined extended position, such positive brakes usually act upon the tape itself and undesirably obliterate the markings thereon after extended usage and are not readily usable to allow only a controlled speed retracting of the tape into the associated tape housing. Therefore, a further need exists for structure by which convenient manual adjustable braking of the tape spool may be effected.

The main object of this invention is to provide a multi-purpose tape measure of the spring biased type and which is useful to persons in many environments to perform multiple functions in a time saving manner.

Another object of this invention is to provide a tape measure also usable to establish a chalk line.

A further object of this invention is to provide a tape measure including sharpeners for both regular and larger size carpenter's pencils.

Yet another object of this invention is to provide a tape measure equipped with a user operated and manually operable friction brake for the spool of the tape measure in addition to the usual tape engaging positive brake provided on conventional tape measures.

Another object of this invention is to provide a tape measure including the usual free tape end equipped abutment hook or flange modified to include a sharpened, retractable penetrable surface penetrating tang to thereby enable the free end of the tape to be substantially non-slip anchored relative to a penetrable surface.

A final object of this invention to be specifically enumerated herein is to provide a multi-purpose tape measure in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
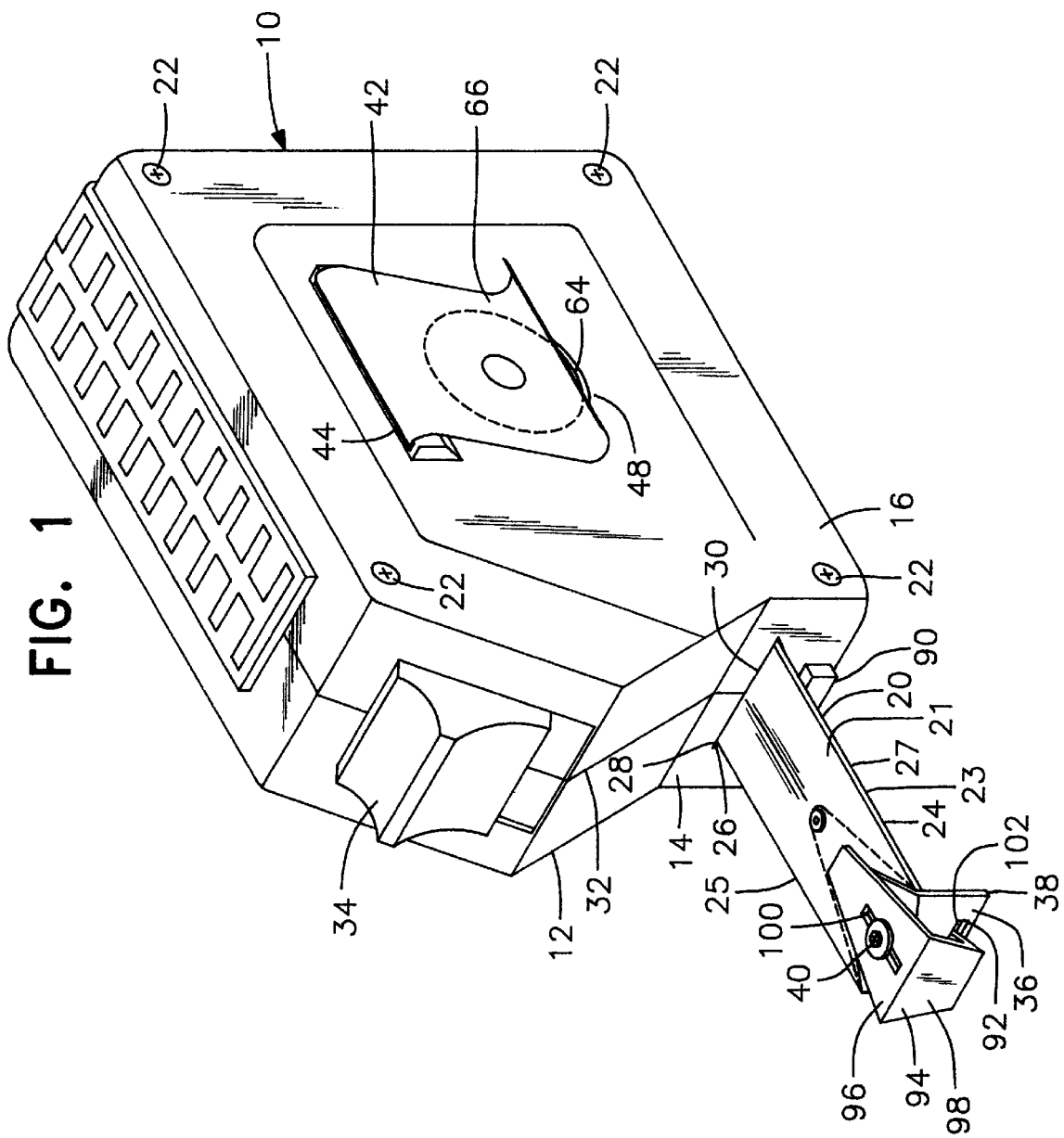
FIG. 1 is a perspective view of a conventional form of tape measure which has been modified to include the improvement features of the instant invention.
Figure 2:
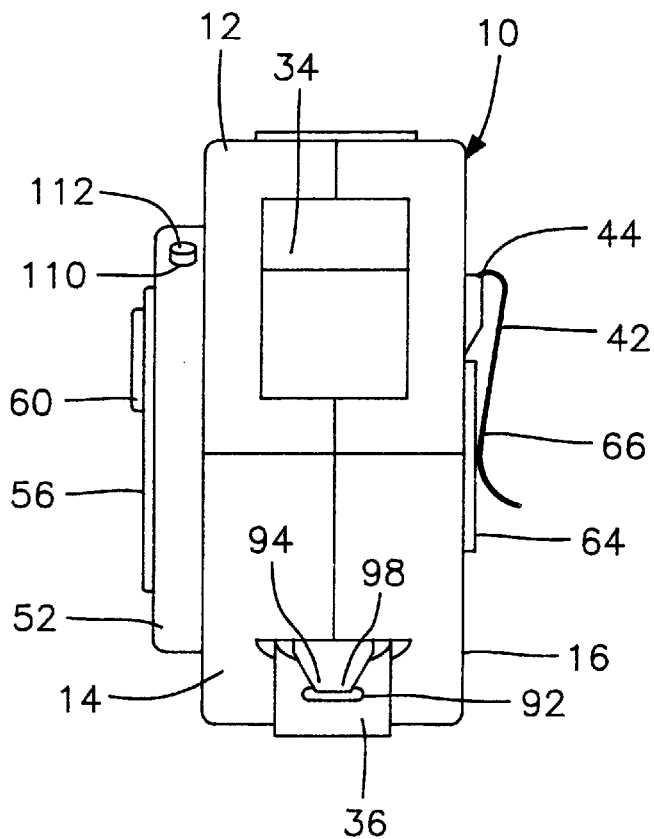
FIG. 2 is an elevational view of the modified tape measure of the instant invention as seen from the left side of FIG. 1.

Although only one preferred embodiment of the invention is explained in detail, it is to be understood that the invention is not limited in its scope to the details of construction and the arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Figure 6:
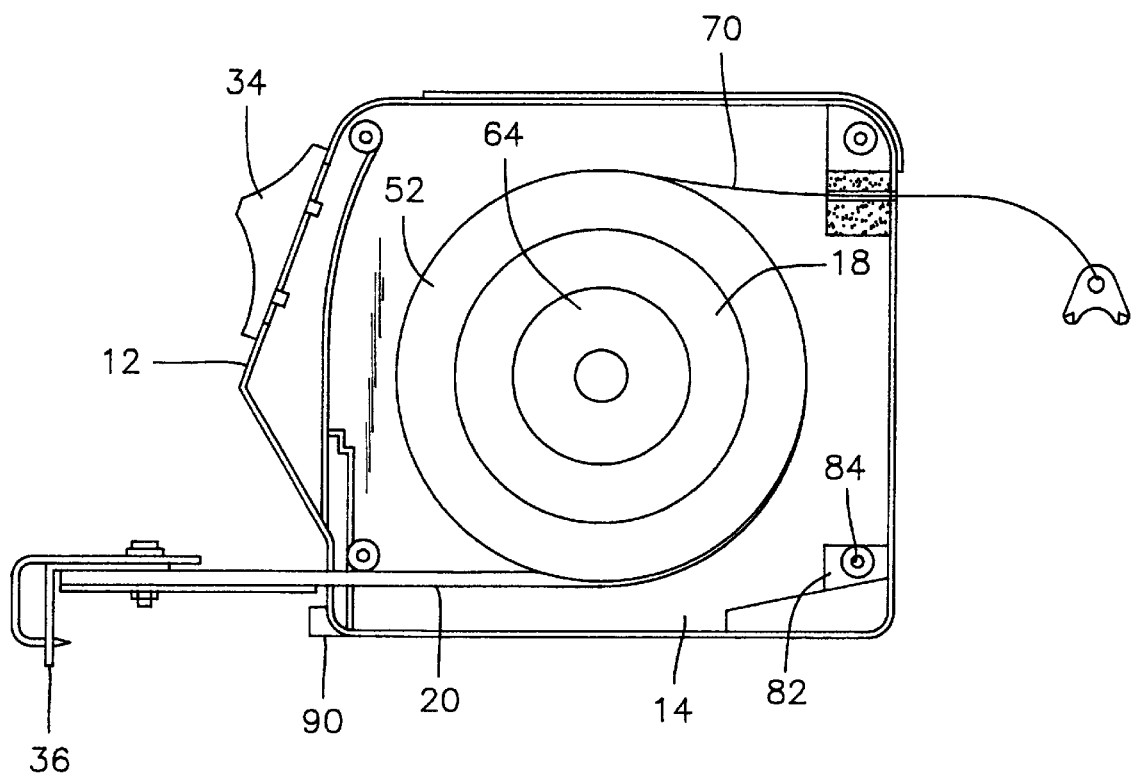
FIG. 6 is an elevational view of the modified tape measure similar to FIG. 4 but with the near side wall of the housing removed.

Referring now more specifically to the drawings the numeral 10 generally designates a basically conventional tape measure including a housing 12 incorporating separable halves 14 and 16 which together enclose a conventional spring biased winding spool 18 having the base end of a flexible tape 20 anchored thereto for spring return winding of the tape 20 on the spool 18 within the housing 12, see FIGS. 1 and 6. The tape includes top and bottom side surfaces 21 and 23 extending between opposite longitudinal side edges 25 and 27.

The housing halves 14 and 16 are removable joined together through the utilization of suitable removable fasteners 22 and the free end 24 of the tape 20 projects outwardly through an ingress/egress opening 26 defined by coextensive notches 28 and 30 formed in the housing halves 14 and 16 and opening toward each other along the parting line 32 of the housing halves 14 and 16, see FIG. 1.

The housing 12 includes a conventional friction brake mechanism (not shown) for engaging the tape 20 within the housing 12 and maintaining the free end 24 of the tape 20 in predetermined extended position, the friction brake mechanism including a thumb or finger engageable slide operator 34 projecting exteriorly of and shiftable relative to the housing 12. In addition, the free end 24 of the tape 20 includes a laterally extending abutment flange or anchor hook 36 mounted on the free end 24 of the tape 20 for limited shifting longitudinally of the tape 20 a distance equal only to the thickness of the flange 36 as at 38. The flange or hook 36 is supported from the free end 24 for limited shifting through the utilization of a pair of slip fasteners, one of which slip fasteners is shown at 40 in FIG. 1.

The tape measure 10 further includes a contoured spring-type belt clip 42 anchored relative to the housing 12 as at 44 and by which the tape measure 10 may be removably supported from the belt or waist band of a workman or other person when the tape measure 10 is not in use.

The foregoing comprises a description of a substantially conventional form of tape measure such as that marketed under the name "CRAFTSMAN®".

Figure 4:
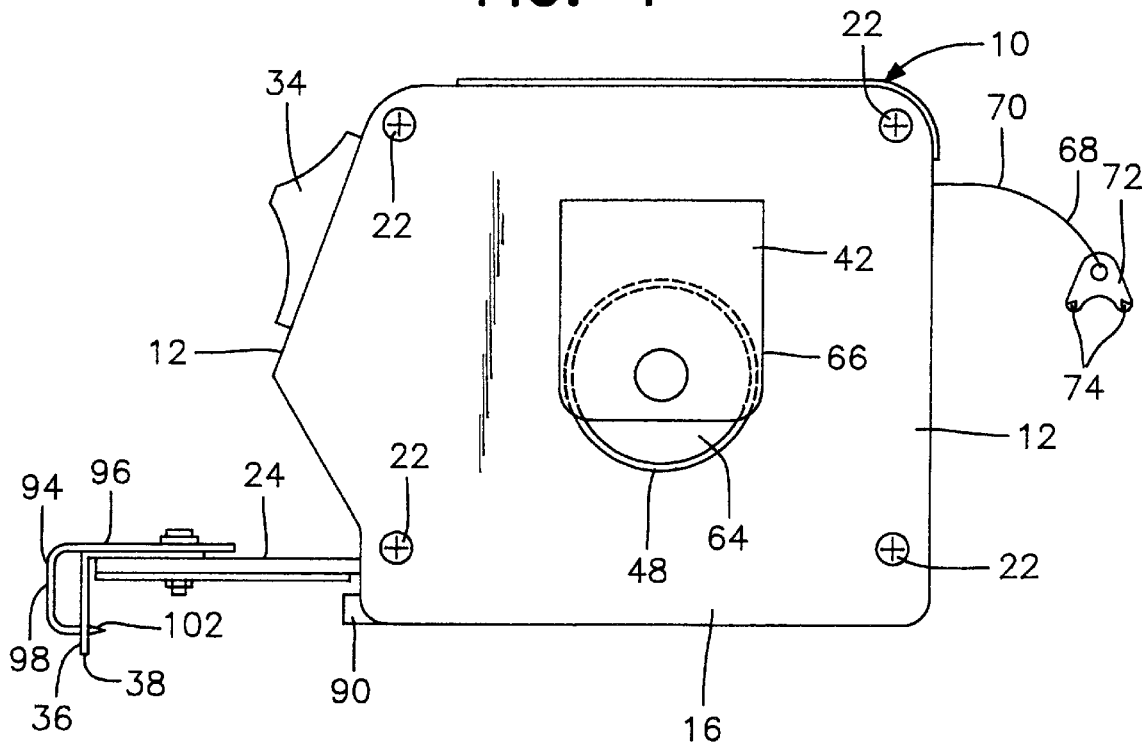
FIG. 4 is an elevational view of the modified tape measure as seen from the front side of FIG. 1 and with the tape and chalk line thereof partially extended.
Figure 4A:
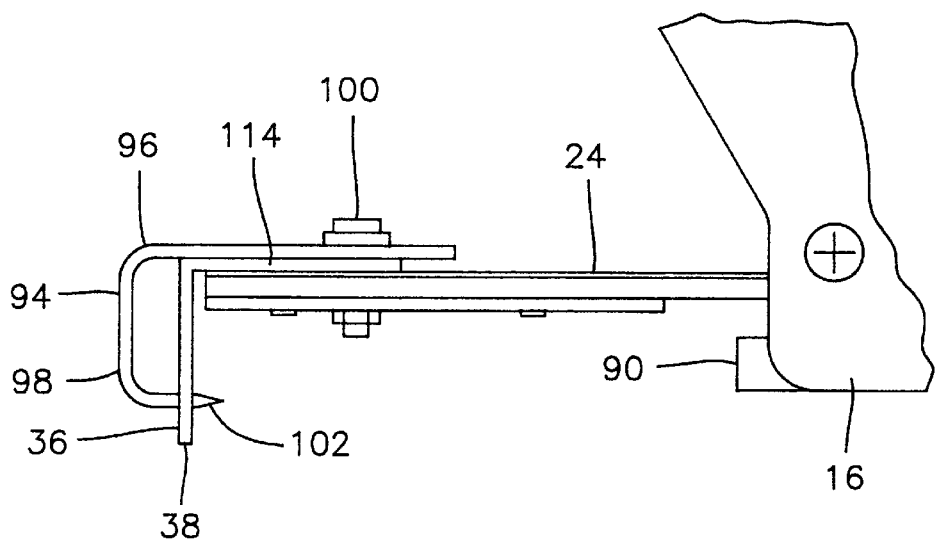
FIG. 4A is an enlarged fragmentary view of the lower left portion of FIG. 4.
Figure 5:
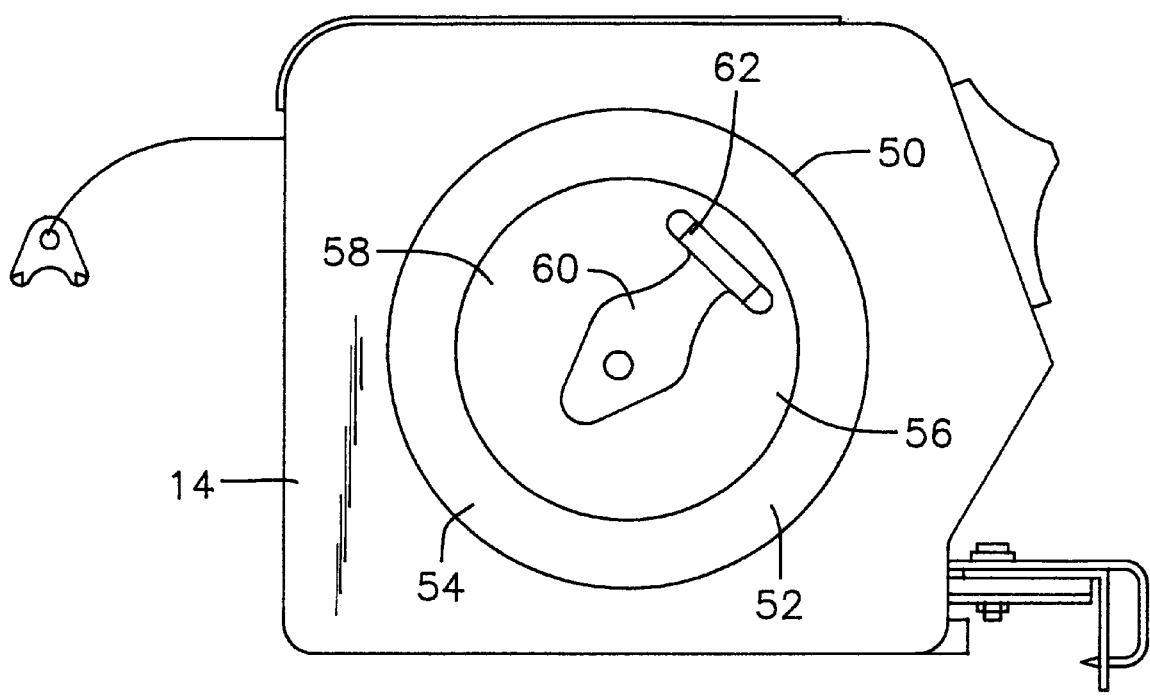
FIG. 5 is an elevational view of the modified tape measure as seen from the rear side of FIG. 4.

For the purpose of modifying the tape measure 10 in accordance with the present invention a central opening 48 has been provided in the housing half 16 and a larger central opening 50 has been provided in the housing half 14, see FIGS. 4 and 5.

A chalk line housing 52 has been mounted in and is stationarily supported from the housing half 14 with one axial face 54 of the housing 52 projecting through the opening 50. The housing 52 rotatably supports a chalk line spool 56 therefrom and the axial face 58 of the spool 56 which corresponds to the axial face 54 includes the usual foldably retractable crank handle 60 hingedly supported therefrom as at 62. The remote axial end or face of the spool 18 includes a friction button or protrusion 64 loosely received in the opening 48 and projecting slightly outwardly thereof. The belt clip 42 includes a spring clamping blade portion 66 which closely overlies the friction button or protrusion 64 in spaced relation thereto and serves as a clamping member for clamping a belt or a waist band portion between the spring clamping blade portion 66 and the protrusion 64 when the tape measure 10 is supported from the belt or waist band of a person during periods of nonuse.

Figure 3:
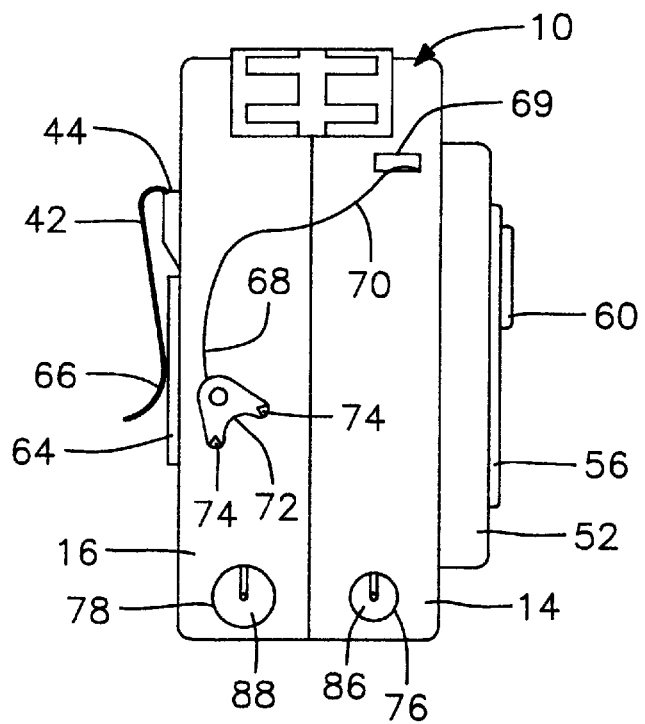
FIG. 3 is an elevational view of the modified tape measure of the instant invention as seen from the right side of FIG. 1.

In addition, the housing half 14 includes an opening 69 therein through which the free end 68 of a chalk line 70 projects, the end of the chalk line 70 remote from the free end 68 being anchored (in any conventional manner) to the spool 56 for winding thereon. The free end 68 of the chalk line 70 includes an anchor 72 supported therefrom provided with teeth 74 for engagement with an object (not shown) to which the free end 68 of the chalk line 70 is to be anchored during the process of forming a chalk line mark, see FIG. 3.

Figure 9:
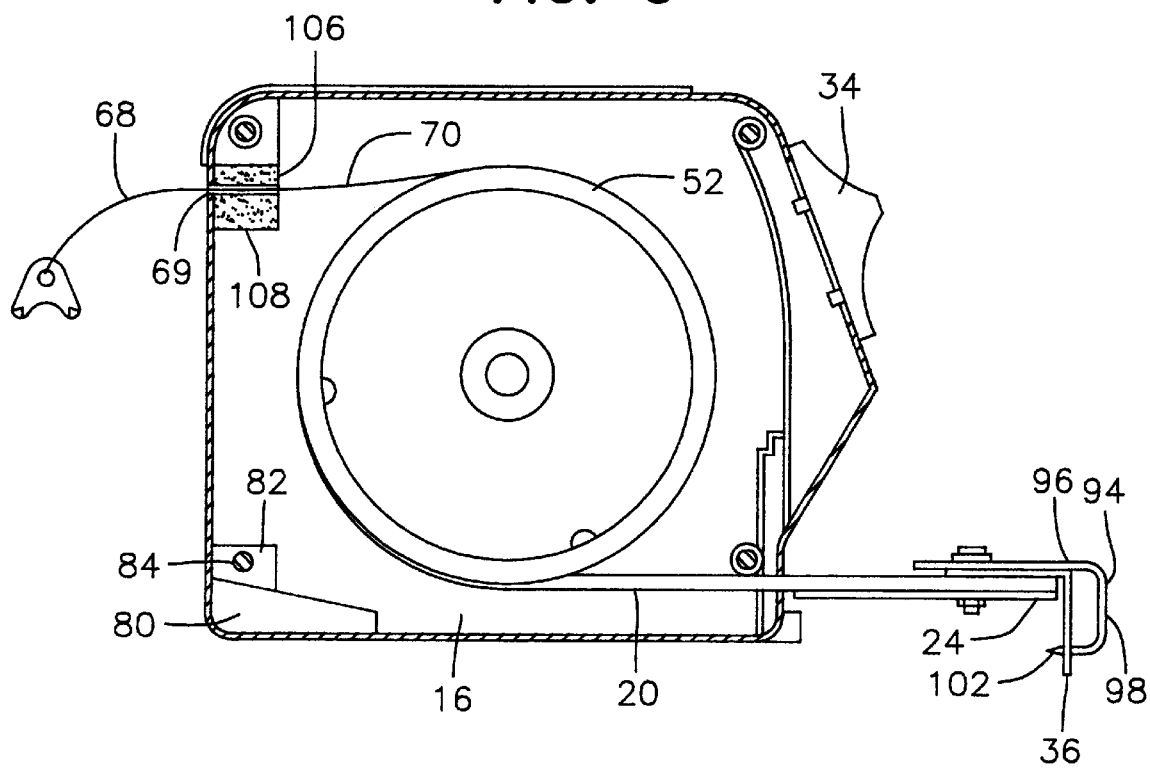
FIG. 9 is an elevational view of the tape measure assembly illustrated in FIG. 6 with the near side housing half and near side portion of the chalk line housing removed.

The housing halves 14 and 16 also are provided with small openings 76 and 78, respectively, and a double pencil sharpening unit 80, see FIG. 9, is anchored within the housing 12 by anchoring tabs carried by opposite sides of the unit 80 and held in position within the housing 12 by pins 84 integral with the housing halves 14 and 16, the unit 80 having small and large diameter tapered pencil sharpening recesses 86 and 88 formed therein registered with and opening outwardly through the openings 76 and 78 for sharpening regular and large size pencils, respectively, therein.

The housing 12 additionally is provided with an elastomer abutment block 90 closely beneath the opening 26 against which the abutment flange or anchor hook 36 may abut when the tape 20 is retracted (unintentionally) into the housing 12 at a too great speed. Compression of the elastomer abutment block 90 in such cases will obviously reduce the abruptness at which inward movement of the free end 24 of the tape 20 is terminated by the block 90.

As may best be seen from FIG. 1 the abutment flange or anchor hook 36 has an opening 92 formed therein. In addition, an L-shaped member 94, including first and second right angulated flanges 96 and 98, is provided on the free end 24 of the tape 20, see FIG. 1. The first flange 96 has a slot 100 formed therein through which the fastener 40 is secured in a loose manner. The flange 96 overlies and generally parallels the free end 24 of the tape 20 and the second flange 98 is disposed normal to the free end 24, extending transversely thereof and projecting downwardly below the free end 24 and terminating downwardly in a reversely turned pointed hook 102 slidably received through the opening 92, see FIGS. 1 and 4.

Not only may the L-shaped member 94 be shifted longitudinally of the free end 24 of the tape as allowed by the length of the slot 100 through which the fastener 40 passes, but the L-shaped member 94 may be angularly displaced relative to the fastener 40 about the center axis thereof a limited amount due to the loose reception of the pointed hook 102 in the opening 92, the angular displacement of the L-shaped member 94 relative to the free end 24 being limited by the opposite end margins of the slot-type opening 92 into which the pointed hook 102 projects.

With reference now more specifically to FIG. 9, it may be seen that the housing half 14 supports a pair of opposing felt type wiper blocks 106 and 108 above and below, respectively, the opening 66 in vertically spaced relation. The chalk line 70 passes snugly between the blocks 106 and 108 and outwardly of the opening 66. Thus, when the chalk line 70 is unreeled from the chalk line spool 56, excess chalk on the line 70 is wiped therefrom by the blocks 106 and 108.

Figure 7:
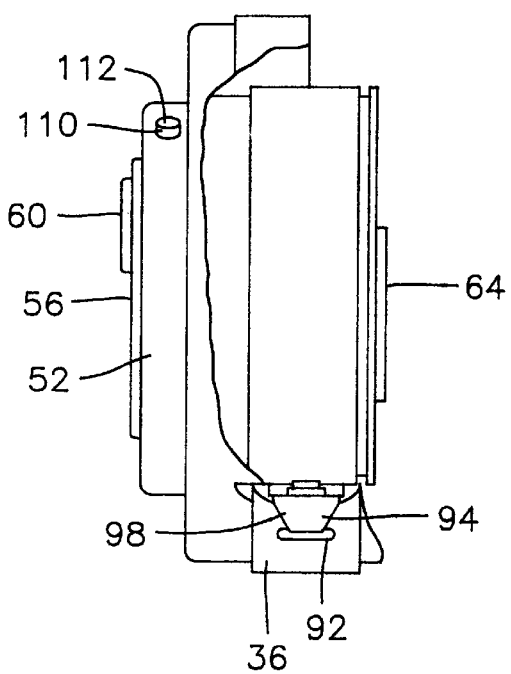
FIG. 7 is an elevational view of the modified tape measure as seen from the left side of FIG. 6 with portions of the remaining housing half broken away.
Figure 8:
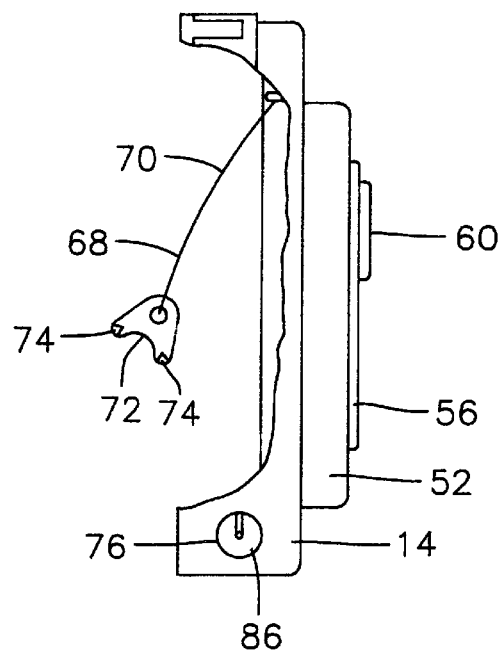
FIG. 8 is an elevational view of the assemblage illustrated in FIG. 7 with the tape spool removed and as seen from the rear of FIG. 7.

Furthermore, the chalk line housing 52 includes an opening 110 therein closed by a removable closure 112, see FIG. 7, and powdered chalk may be admitted into the housing 52 through the opening 110 after removal of the plug or closure 112, as needed.

In operation, the tape measure 10 is usable in the conventional manner. The abutment flange or hook 36 is supported from a right angle mounting flange 114, see FIG. 4, shiftably supported from the free end 24 of the tape 20 for limited shifting longitudinally of the free end 24 as is conventional. The longitudinal shifting of the right angle flange 114 is limited to a distance equal to the thickness of the abutment flange or hook 36, thereby enabling the abutment flange 36 to have its outer side abutted against an opposing surface for measuring the distance between that surface and a remote location. On the other hand, the inner side of the abutment flange may be abutted against an opposing surface facing in the opposite direction and the tape 20 may be utilized to measure the distance between that surface and a remote location. If, however, the inner side of the abutment flange 36 is abutted against an oppositely facing penetrable wooden stud surface or the like, manual pressure may be applied to the outer side of the second flange 98 so as to project the pointed hook 102 through the opening 92 as shown in FIG. 4. In this manner, the pointed hook 102 may penetrate the side of the stud against which the inner side of the abutment flange 36 is abutted and retain the abutment flange 36 in position on that stud as the housing 12 is moved to the remote location for measuring the distance between that location and the far side of the stud with which the abutment flange is engaged, the pointed hook 102 serving to retain the abutment flange end of the tape 20 in proper position on the stud.

On the other hand, if the inner side of the abutment flange 36 is to be engaged with an opposing surface which is not to be penetrated by the pointed hook 102, the first flange 96 is supported from the free end 24 for sufficient longitudinal movement along the free end 24 to enable the pointed hook 102 to be retracted partially through the opening 92 so that the pointed hook 102 does not engage the nonpenetrable surface with which the inner side of the abutment flange 36 is engaged.

After a measurement has been made and the friction brake member 34 has been released to enable the tape 20 to be rewound on the tape spool 18, uncontrolled rapid retraction of the tape 20 into the housing 12 may be controlled by applying inward pressure on the blade portion 66 such that its inner surface contacts and frictionally brakes rotation of the projection 64. In this manner, the speed of retraction of the tape 20 back into the housing 12 may be controlled as desired. Although the friction brake member or mechanism 34 can be used to some extent for this purpose, it is difficult to use the friction brake mechanism 34 to precisely control retraction speed of the tape 20. Further, the friction brake mechanism 34, when actuated, frictionally engages a friction member (not shown) with the printed upper side of the tape 20 and thus has a tendency to erase the graduations and numbers (not shown) from the upper side of the tape 20.

In addition to utilizing the blade portion 66 as a friction brake against the projection 64 for controlling the speed of return of the tape 20 into the housing 12, the abutment block 90 (constructed of elastomer material or the like) will cushion termination of inward movement of the free end 24 of the tape 20 into the housing 12 by engagement of the abutment flange 36 with the abutment block 90.

When it is desired to use the chalk line 70, the chalk line 70 may be pulled from the housing 12 in the conventional manner and utilized to establish a chalk mark in the same manner in which a conventional chalk line is used. Of course, when it is desired to retract the chalk line 70 back into the housing 12, the crank handle 60 is pivoted to the operative position and the crank handle 60 may be utilized to rotate the chalk line spool 56 relative to the chalk line housing 52 and thus to retract the chalk line 70 back into the housing 12.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A tape measure including a housing having a plurality of sides, one of said sides extending between a pair of opposite sides of said housing and having an egress/ingress opening therethrough, a spring biased tape spool journaled in said housing between said opposite sides and having a first end portion of an elongated flexible measuring tape anchored thereto for winding said tape upon said tape spool, said tape including a second end portion projecting through and outwardly of said opening, said second end portion being retractable through said opening under the biasing action of said tape spool, said tape including oppositely facing side surfaces extending between opposite longitudinal side edges, said second end portion including an abutment flange supported therefrom and disposed generally normal to the lengthwise extent of said tape and projecting outwardly of one of said side surfaces, said abutment flange defining an abutment flange opening therethrough spaced laterally outwardly of said one side surface, a generally L-shaped member including first and second generally right angled flanges, said first flange overlying the other of said side surfaces and said second flange overlying said abutment flange, said first flange being mounted from said second end portion for free limited shifting relative thereto lengthwise of said one end portion, said second flange including a sharp, laterally directed projection aligned with and projecting through said abutment flange opening for penetrating a penetrable surface against which said abutment flange is abutted, said projection being shiftable through and retractable relative to said abutment flange opening upon shifting of said first flange between the limit positions of shifting thereof relative to said second end portion.

2. A measuring tape including a first end portion supported from and retractable within a housing and a second end portion extendable from and retractable toward said housing, said tape including oppositely facing side surfaces extending between opposite longitudinal side edges of said tape, said second end portion including an abutment flange supported therefrom disposed generally normal to the lengthwise extent of said tape and projecting outwardly of one of said side surfaces, said abutment flange defining an opening therethrough spaced laterally outwardly of said one side surface, a sharp, pointed projection mounted from said second end portion for free limited shifting relative thereto lengthwise of said one end portion and projectable through said opening for penetrating a penetrable surface against which said abutment flange is abutted, said projection being shiftable through and retractable relative to said opening upon shifting of said first flange between the limit positions of shifting thereof relative to said second end portion.

* * * * *